Oct. 12, 1943.  C. J. JAHANT  2,331,323
PNEUMATIC TIRE
Filed Feb. 16, 1939   2 Sheets-Sheet 1

INVENTOR
CHARLES J. JAHANT
BY Evans & McEny.
ATTORNEYS

Oct. 12, 1943.   C. J. JAHANT   2,331,323
PNEUMATIC TIRE
Filed Feb. 16, 1939   2 Sheets-Sheet 2
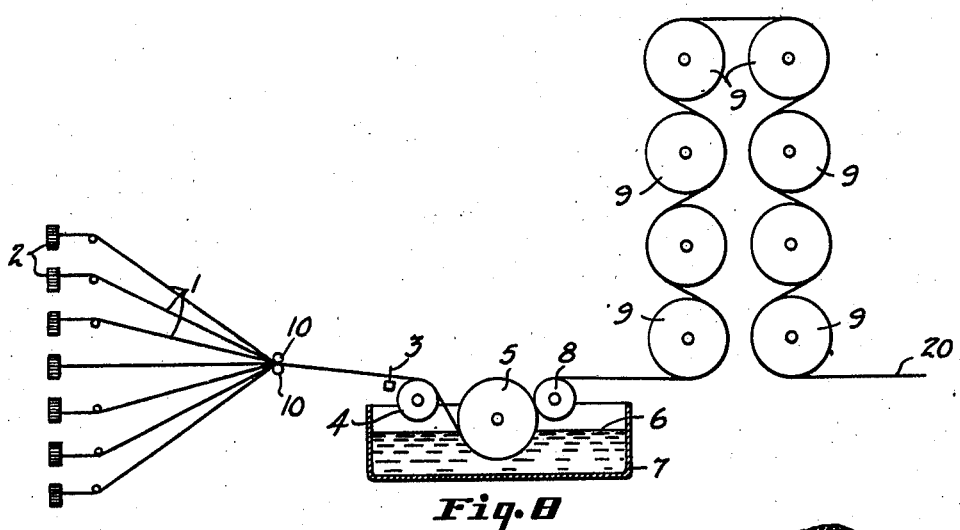
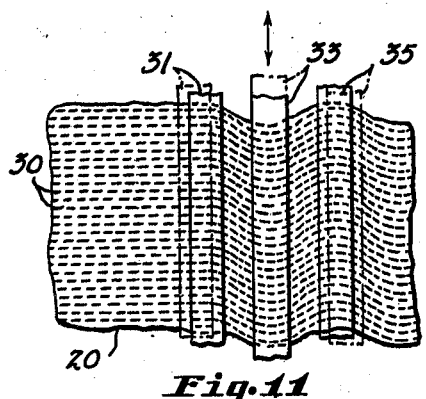
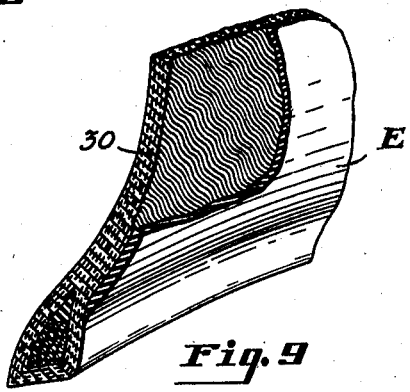
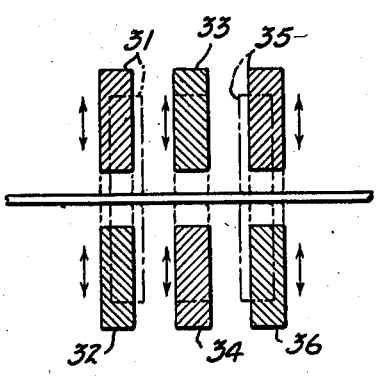
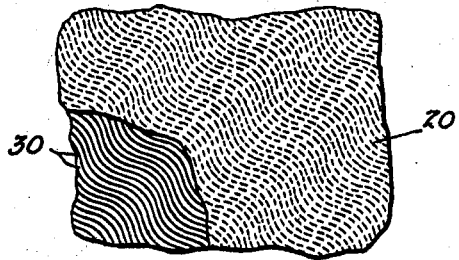
INVENTOR
CHARLES J. JAHANT
BY Evans & McCoy
ATTORNEYS Patented Oct. 12, 1943

2,331,323

UNITED STATES PATENT OFFICE 2,331,323

PNEUMATIC TIRE

Charles J. Jahant, Akron, Ohio, assignor to The General Tire & Rubber Company, Akron, Ohio, a corporation of Ohio Application February 16, 1939, Serial No. 256,698

3 Claims. (Cl. 152—356)

This invention relates to pneumatic tires and particularly to the construction of the flexible stretch-resisting carcass of such tires.

Pneumatic tires ordinarily have carcasses composed of several plies of cord fabric which resists stretching of the tire walls by internal air pressure and which has sufficient tensile strength to give the required load-sustaining and shock-resisting qualities. The number of plies necessary in a given case depends on the relative size and load-carrying capacity of the tire. In those tires adaptable for truck and bus use, a very large number of plies is necessary and the thickness of the tire carcass is increased to such an extent that its flexibility is greatly impaired, and deterioration due to heating of the tire carcass in service is greatly increased.

It is the object of this invention to provide pneumatic tires of the required strength having greater flexibility and which, consequently, generate less heat in service, the tire of this invention having an inextensible carcass which is very thin but which possesses great strength.

A further object of the invention is to provide a tire in which the stretch-resisting elements of the carcass are highly heat-resistant.

Heretofore, cotton cord has been the usual material employed in the carcasses, but some tires have been made in which threads or cords composed of twisted rayon filaments or fibres have been used instead of the usual cotton cord. In all threads or cords made by twisting together either short fibres as in cotton cords or continuous filaments as in rayon cords, the tensile strength of the cord is only a small fraction of the total strength of the fibres or filaments in any cross-section of the cord due to the fact that tensile stresses are not uniformly applied to the individual fibres or filaments of a twisted cord.

It is an object of this invention to so dispose individual filaments of stretch-resisting material in the tire carcass as to distribute the tension more equally to the individual filaments and thus obtain a great increase in the strength of the carcass.

A further object is to provide a more complete bond between the rubber and the stretch-resisting material in the tire carcass.

With the above and other objects in view the invention may be said to comprise the tire and the carcass fabric employed in building the tire as illustrated in the accompanying drawings hereinafter described and particularly set forth in the appended claims, together with such variations and modifications thereof as will be apparent to those skilled in the art to which the invention appertains.

Reference should be had to the accompanying drawings forming a part of this specification, in which:

Fig. 8 is a schematic view of suitable apparatus for preparing a sheet or ribbon of the reinforcing material;

Fig. 9 is a fragmentary perspective view showing a modified form of tire;

Fig. 10 is a fragmentary plan view of a piece of the tire fabric used in making the tire shown in Fig. 9;

Figs. 11 and 12 are diagrammatic plan and sectional views, respectively, showing one method which may be employed to form the tire fabric shown in Fig. 10.

Figure 1:
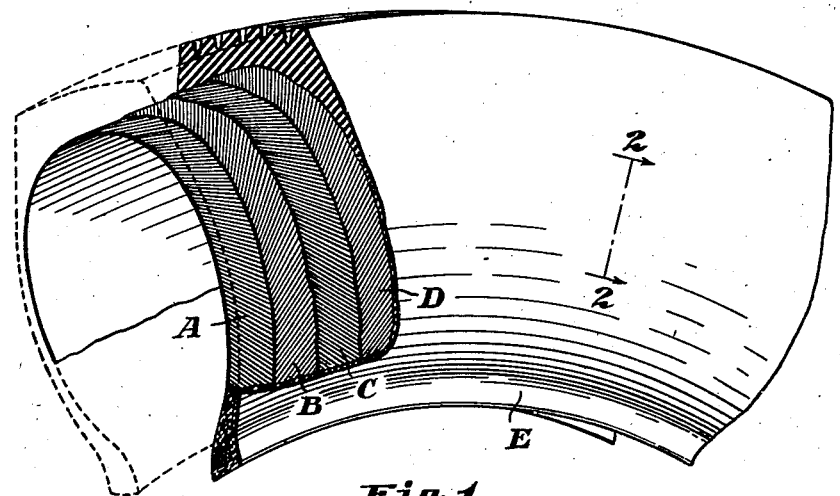
Figure 1 is a perspective view of a tire with parts broken away to show the construction of its carcass.

The present invention contemplates the use of ply stock in the tire carcass in which the stretch-resisting elements are disposed in parallel relation as in the conventional cord tire but in which the stretch-resisting elements are in the form of straight filaments instead of cords composed of twisted strands. While the strength of the individual filaments is much less than that of the cords now being used in tires, the number of filaments per inch of reinforcing fabric will be many times the number of cords and greater strength may be obtained in a carcass which is much thinner and which has much greater flexibility than a carcass made of twisted cords.

The individual filaments employed need only be of sufficient diameter to withstand the relatively slight tension to which they are subjected in the process of forming the tire fabric. By reason of mechanical difficulties incident to the handling of the finer filaments such as thread yarn filaments, a heavier filament is preferred. An example of the type of filament preferred, is the rayon filament known in the trade as artificial horsehair which is of approximately the same diameter as the hair from the tail of a horse. Filaments from .004 to .006 inch in diameter have sufficient individual strength for convenient handling in the rubberizing process. The filaments should be disposed in parallel relation in the tire fabric and the distribution thereof should be reasonably uniform. So long as these conditions are maintained the advantages of the present invention are obtained regardless of the fineness of the individual filaments. To attain the best results each individual filament should be embedded in and bonded to the rubber, and for this reason it is preferred to employ filaments of a size and strength such that they may be fed from individual spools in the rubberizing operation.

In tire fabric employing cord composed of twisted strands, the union of the cords to the rubber is greatly assisted by the penetration of the rubber between the strands and usually as in the ordinary cotton cord tire fabric there is little or no adhesion of the rubber to the individual fibres. In the tire fabric of the present invention it is highly important that there be a strong bond between the rubber and the surfaces of the individual filaments. In order to obtain a strong bond between the rubber and filaments the filaments may be coated by dipping in an adhesive substance which strongly adheres to the filaments and to which rubber will strongly adhere after which sheets of rubber may be applied to a sheet of filaments by conventional calendering or spreading operations. The adhesive substance may be a suitable rubber dispersion such as latex containing ingredients which promote adhesion to the material of the filament and such a solution is preferred since it provides a vulcanizable coating for the individual filaments which serves to bind the filaments together in the form of a sheet to which a layer of rubber may be conveniently applied in a spreading or calendering machine.

Filaments suitable for use in my improved tire fabric may be made of various kinds of cellulose or cellulosic derivatives such as viscose and cuprammonium rayons, or other materials of corresponding strength and flexibility and which are not injuriously affected by the heat to which the tires are subjected in the vulcanizing process. Filaments suitable for tire fabric should have a strength of two grams or more per denier and preferably above 2.5 or 3 grams per denier with sufficient elasticity and stretch to withstand the operations incident to tire building. They should preferably have a stretch before rupture of 5 to 15% and should not soften appreciably below 300° F.

Several methods of increasing the adhesiveness of latex solutions are known. For example, by the addition to the latex of resorcinol formaldehyde resin and other suitable compounding ingredients as disclosed in the Church and Maney Patent 2,128,229 granted August 30, 1938. It is preferred that the latex be suitably compounded with sulphur and accelerator and that a concentration with 20–40% rubber solids be used so as to form a thicker coating of vulcanizable rubber on the filaments dipped therein.

Another suitable rubber-to-filament adhesive may be prepared by making a solution of a rubber reaction product such as that produced by mixing 100 parts by weight of pale crepe rubber with 14 parts of acidified aluminum sulphate, represented by the formulae $$Al_2(SO_4)_3 \cdot H_2SO_4 \cdot 3H_2O + Al_2(SO_4)_3 \cdot 18H_2O$$

3.5 parts of phosphorus pentoxide, and 1.5 parts water; sheeting out the product to about .1″ in thickness; heating the sheeted mixture for about 105 minutes at 145° C. in vacuum, and masticating the product to render it soluble. The concentration of a solution of the product used will depend on the viscosity. A dilution sufficient to enable it to wet the fibres should be used. If desired, a viscous solution of this adhesive may be emulsified in water and the resulting emulsion may be mixed with latex to form an aqueous dip for application to the filaments.

In the preparation of ply material from filaments which are not woven into fabric, the single filaments 1 (Fig. 8) may be drawn from the creel spools 2 between the guide rolls 10 through comb 3, which serves to space the filaments correctly, over the idler roller 4, and under the roll 5. The under surface of the roll 5 is immersed below the surface of one of the above mentioned suitable adhesive liquids 6 in the tank 7 to thoroughly wet the filaments 1 while arranged in spaced relation on the roll 5. The excess adhesive liquid is removed from the filaments by means of the squeeze roll 8 and the filaments are then drawn around a plurality of steam heated drier drums 9. The rolls 4, 5, 8, and 9 are operated at a suitable speed and are situated in close proximity to each other so as to allow a minimum amount of unsupported material and thus prevent twisting and mixing of the fibres.

Figure 3:
Fig. 3 is an enlarged sectional view of a sheet or ribbon of reinforcing material and showing the ends of the fibres or filaments and the film of adhesive material.
Figure 5:
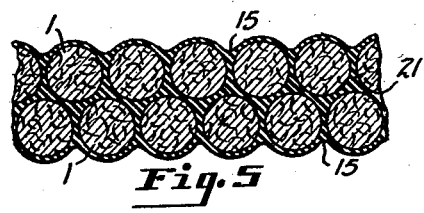
Fig. 5 is an enlarged vertical sectional view of a ribbon or sheet of reinforcing material containing a plurality of layers of reinforcing filaments.

By selecting the proper number and spacing of the filaments 1, a single layer of parallel filaments or a plurality of layers may be formed on the roll 4 and carried through the adhesive liquid 6 and the drier 10 to form a single sheet 20 of substantially parallel filaments, illustrated in Fig. 3, or a laminated sheet 21 of parallel fibres illustrated in Fig. 5, respectively. The sheets 20 and 21 are made up of substantially parallel filaments held in position by means of the film 15 of adhesive material.

Figure 4:
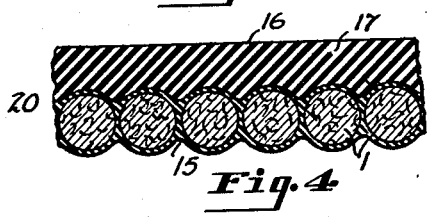
Fig. 4 is an enlarged sectional view of the sheet or ribbon of Fig. 1 coated on one side with suitably compounded rubber.

The sheet 20 of dipped and dried filaments coming from the drier 10 may either be passed through a conventional calender and skim coated with suitably compounded rubber, or it may be sprayed with a suitably compounded rubber dispersion and dried in a suitable drier to form ply material 16 of Fig. 4 which is made up of the parallel fibres 1, the dry dipped material 15, and the rubber coating 17.

Figure 7:
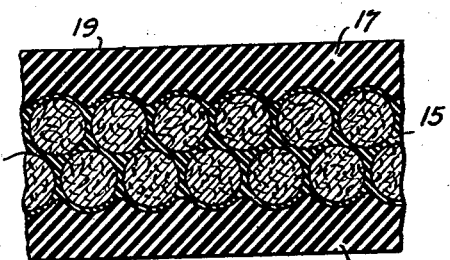
Fig. 7 is an enlarged vertical sectional view of the sheet or ribbon of Fig. 5 coated on both sides with a suitably compounded rubber.
Figure 6:
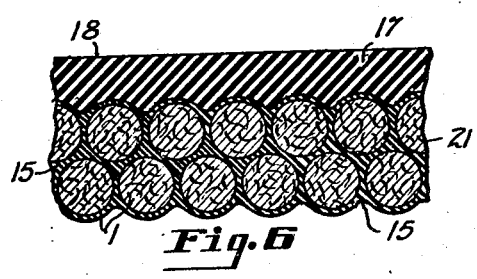
Fig. 6 is an enlarged vertical sectional view of the sheet or ribbon of Fig. 5 coated on one side with a suitably compounded rubber.

The laminated sheet 21 (Fig. 5) of dipped and substantially parallel filaments 1 may, if desired, also be produced by superimposing a plurality of sheets 20 to form a plurality of layers of filaments. It is either skim coated or sprayed, as above, with rubber or latex 17 to form the ply material 18 of Fig. 6. The laminated sheet 21 may, if desired, be coated on both sides with rubber 17 of the desired thickness to form the ply fabric 19 of Fig. 7. The filament sheets 20 or 21 may be plied with rubber in the tire building operation but it is preferred to apply the layer 17 of rubber or latex to the sheets 20 or 21 to form a fabric more convenient for tire building.

It is apparent that the width of the sheets of parallel filaments 20 or 21, being dependent upon the number and spacing of filaments, may be varied to suit the available apparatus. Thus, if desired, the fibres may form a sheet several feet in width or a ribbon as small as a fraction of an inch in width may be prepared. If, because of apparatus limitations or other factors, it is desirable to prepare the sheets 20 or 21 in the form of ribbons, the ply fabric may be prepared by feeding a plurality of these ribbons side by side in parallel relation to a calender or spreader which will apply a coating of rubber to form a relatively wide sheet of ply material.

Although adhesion between the filaments and rubber may be obtained with a single coating of a rubber dispersion containing a suitable adhesive ingredient such as a resorcinol formaldehyde resin, it is preferred that the filaments be given a plurality of coatings of a material containing successively larger proportions of rubber solids and successively smaller proportions of adhesive ingredient. Thus the filaments may first be passed through a liquid containing a small proportion (8 to 10%) of rubber solids and then through a liquid containing 40% or more rubber solids. When the filaments are treated as last mentioned the film 15 of dry dip material is softer and of greater thickness and the adhesion between the plies of the tire is improved. In any case, however, the film of coating material should preferably contain a substantial percentage of rubber suitably compounded so that substantial vulcanization will not occur during the drying operation. The bond between the individual filaments may then be easily ruptured or stretched to permit a slight separation of the filaments I when a tire built by the well known flat band process is expended.

The ply material from the dryer or the calender may be passed through a bias cutter and cut into strips of suitable width and used in tire construction in the same manner as the conventional cord fabric, the filaments extending diagonally in the tire and the filaments of successive plies having opposite angularity.

Figure 2:
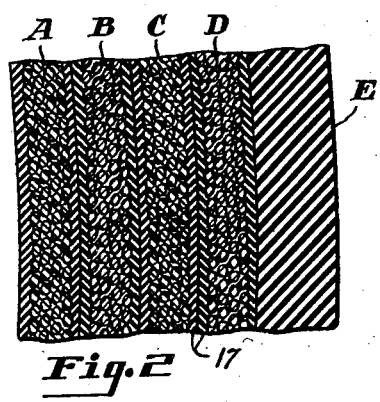
Fig. 2 is an enlarged sectional view taken on the line 2—2 of Fig. 1 and showing the ends of the filaments or fibres used for reinforcement of the tire.

Figs. 1 and 2 illustrate a multiple ply tire having a suitable outer abrasion resisting coating E and a carcass having plies A, B, C, and D, each ply being made from the above mentioned ply materials and consisting of a plurality of layers of substantially parallel dipped and dried filaments bound together by an adherent vulcanized rubber composition with layers of a suitably compounded rubber 17 separating the filaments in one ply from those in an adjacent ply. The film 15 of suitably compounded rubber adhesive coated on the filaments should be of sufficient thickness to obtain good adhesion between the successive layers of filaments. The filaments in plies A and C run in a direction which may be substantially perpendicular to that of the filaments in the plies B and D and the coating 17 of elastic rubber should, therefore, be of a thickness which is sufficient to compensate for the relative movements between the successive plies when the tire wall is flexed.

It is preferred to form each ply of the tire of a plurality of layers of superposed sheets of parallel filaments since there is less relative movement between parallel filaments and, consequently, a very thin layer of rubber between superposed layers of parallel cords is sufficient. By superposing two or more layers of parallel filaments in each ply the number of the thicker layers of rubber 17 is reduced and the thickness of the tire carcass is materially lessened. If desired, the tire may be built up of superposed layers of fabric such as shown in Fig. 4 in accordance with the usual cord tire practice, successive filament layers having opposite angularity. As is well known, in practice the reinforcing elements of tires extend between the beads on opposite sides of the tire with each end of substantially all the elements turned over a bead, so that relative bodily movement of the filaments and the beads is substantially prevented.

In the modified construction shown in Figs. 9 to 12, inclusive, the construction of the tire differs from those previously described only in that the individual filaments 30 are bent alternately back and forth in the plane of the sheet to provide closely spaced, relatively short undulations which greatly increase the capability of the tire walls to withstand sharp local flexures such as caused by running over a brick or stone on a road surface. The undulations of the filaments permit portions of the inflated tire to be deflected inwardly at a sharp angle without injury to the reinforcing elements. The undulations may be formed in the filaments by first forming a sheet of filaments coated with the adhesive latex film and then alternately bending the sheet back and forth in the plane of the sheet. A previously formed sheet composed of a latex composition with embedded straight filaments may be passed intermittently between the jaws of a series of clamps extending transversely across the sheet, an intermediate clamp being moved endwise transversely of the sheet while the clamps on the opposite sides thereof are moved toward the intermediate clamp. Figs. 11 and 12 show three clamps, one having upper and lower clamping bars 31 and 32, the second upper and lower clamping bars 33 and 34 and the third upper and lower clamping bars 35 and 36. The sheet is advanced intermittently between the clamping bars and during each interval of rest the bars are simultaneously moved to clamping position. With the fabric clamped between the bars the intermediate clamping bars 33 and 34 are moved endwise in a plane of the sheet and transversely thereof while the clamping bars 31 and 32 and 35 and 36 are simultaneously moved longitudinally of the sheet toward the bars 33 and 34 at the rate necessary to permit the lateral displacement of the filaments in the plane of the sheet. The tacky body of the sheet retains the filaments in the distorted form and by superposing a plurality of sheets in which the filaments have an undulating form or by applying a layer of latex composition or rubber a sheet of tire fabric suitable for tire building may be made.

In the tire of the present invention all of the filaments in each ply are parallel and lie in the direction of the applied stresses, and hence the total cross-sectional area of the fibrous material required in a tire is reduced below that of a twisted cord tire having a carcass of equivalent strength. The relatively close spacing of the small diameter filaments also adds to the strength of the tire carcass and superior strength is obtained in a carcass much thinner than a carcass made from twisted cords. By reason of the reduced thickness of the tire carcass the flexibility of the tire wall is greatly increased and the heating of the tire in service is greatly lessened.

The entire surface of each filament being coated with an adhesive rubber composition by the dipping operation, a superior bond between the rubber and tension elements of the tire carcass is obtained. With the parallel filaments arranged in relatively flat sheets any displacement of the individual filaments is relatively uniform during the tire building and vulcanizing operations, and the individual filaments have substantially equal tension resistance in the completed tire.

By reason of the bonding of the individual filaments throughout their length to the rubber of the tire carcass, rupture of individual filaments will not appreciably weaken the tire carcass unless there be a large number of breaks within a restricted area.

Although several embodiments of the invention have been herein shown and described, it will be understood that numerous modifications of the construction shown may be resorted to without departing from the spirit of this invention as defined in the appended claims.

What I claim is:

1. A pneumatic tire having a carcass comprising a plurality of superposed plies, substantially all of said plies containing a plurality of layers of untwisted relatively heavy single synthetic filaments having a diameter of not less than about .004 inch, the filaments of each ply being disposed in substantially parallel relation and extending from bead to bead, said filaments being primarily and substantially entirely enveloped in a thin adherent composition, the filaments of each ply being disposed at an angle to the filaments of an adjacent ply, successive plies being spaced and bonded to interposed layers of a flexible rubber composition.

2. A pneumatic tire having a carcass comprising a plurality of superposed plies, substantially all of said plies containing a plurality of layers of untwisted relatively heavy single synthetic filaments derived from cellulose, having a diameter of not less than about .004 inch, the filaments of each ply being disposed in substantially parallel relation and extending from bead to bead, said filaments being primarily and substantially entirely enveloped in a thin adherent composition, the filaments of each ply being disposed at an angle to the filaments of an adjacent ply, successive plies being spaced and bonded to interposed layers of a flexible rubber composition considerably thicker than the composition between layers of the filaments in the plies.

3. A pneumatic tire having a carcass comprising a plurality of superposed plies, substantially all of said plies containing a plurality of layers of untwisted relatively heavy single synthetic filaments having a diameter of not less than about .004 inch, the filaments of each ply being disposed in substantially parallel relation and extending from bead to bead, said filaments being primarily and substantially entirely enveloped in a thin adherent composition and having a strength of at least two grams per denier, a stretch of at least 5% and a softening point above 300° F., the filaments of each ply being disposed at an angle to the filaments of an adjacent ply, successive plies being spaced and bonded to interposed layers of a flexible rubber composition.

CHARLES J. JAHANT.